(12) United States Patent
Poddar

(10) Patent No.: US 8,246,084 B2
(45) Date of Patent: Aug. 21, 2012

(54) THREADED PIPE JOINT COUPLING WITH WIRE LOCK DEVICE

(75) Inventor: Deepak Poddar, Bangalore (IN)

(73) Assignee: Ashirvad Pipes Pvt. Ltd., Bangalore (IN)

( * ) Notice: Subject to any disclaimer, the term of this patent is extended or adjusted under 35 U.S.C. 154(b) by 828 days.

(21) Appl. No.: 11/569,591

(22) PCT Filed: May 28, 2004

(86) PCT No.: PCT/IN2004/000147
§ 371 (c)(1),
(2), (4) Date: Oct. 22, 2007

(87) PCT Pub. No.: WO2005/116511
PCT Pub. Date: Dec. 8, 2005

(65) Prior Publication Data
US 2008/0067808 A1    Mar. 20, 2008

(51) Int. Cl.
*F16L 37/00* (2006.01)
(52) U.S. Cl. ............ 285/308; 285/39; 285/305; 285/333
(58) Field of Classification Search ............. 285/39, 285/305, 308, 321, 333–334
See application file for complete search history.

(56) References Cited

U.S. PATENT DOCUMENTS

| | | | |
|---|---|---|---|
| 670,584 A * | 3/1901 | Fowle, Jr. ................. 285/148.7 |
| 1,916,989 A * | 7/1933 | Rader ........................ 428/609 |
| 2,380,690 A * | 7/1945 | Graham ..................... 285/114 |
| 2,458,714 A * | 1/1949 | Mahoney ................... 285/111 |
| 2,553,836 A | 5/1951 | Stone |
| 2,785,910 A * | 3/1957 | Munger ...................... 285/22 |
| 3,574,359 A | 4/1971 | Klein |
| 3,574,373 A * | 4/1971 | Le Derf et al. ............ 403/296 |
| 3,701,550 A | 10/1972 | Jacobson |
| 3,880,451 A * | 4/1975 | Kinzbach .................... 285/92 |
| 4,113,287 A | 9/1978 | Bogatirev et al. |
| 4,659,119 A | 4/1987 | Reimert |
| 5,362,114 A * | 11/1994 | Levingston ................. 285/334 |
| 5,707,088 A * | 1/1998 | Miller et al. ................ 285/345 |

(Continued)

FOREIGN PATENT DOCUMENTS
WO    02/061316 A2    8/2002

*Primary Examiner* — Aaron Dunwoody
*Assistant Examiner* — Fannie Kee
(74) *Attorney, Agent, or Firm* — Jay R. Yablon

(57) ABSTRACT

A threaded pipe (11) and coupler (5) made of polyvinyl chloride, the coupler (5) comprising two coupling ends having inner square-shaped threading (3, 14), each receiving a pipe end (4, 11) having an outer square-shaped threading, a sealing ring (2, 13) being provided between each coupling end of an inner surface of the coupler (5) and an outer surface of the corresponding pipe end (4, 11); a groove (10), being formed on the inner surface of the coupler (5), and co-operating with a part of the outer surface of the pipe end after the threading, when the pipe (11) is threadingly coupled in the coupler (5), to form a tangential hole (42) between the outer surface of the pipe (11) and the inner surface of the coupler (5) with the groove made on the outer surface of the coupler aligning with a groove of first pipe, wherein a wire lock (41) is inserted in the tangential hole (42) to lock the coupling of the coupler (5) with the end of the pipe (11).

16 Claims, 17 Drawing Sheets

U.S. PATENT DOCUMENTS

| | | |
|---|---|---|
| 5,743,333 A | 4/1998 | Willauer et al. |
| 5,871,239 A | 2/1999 | Boscaljon et al. |
| 6,179,347 B1 * | 1/2001 | Dole et al. .................... 285/321 |
| 6,302,445 B1 * | 10/2001 | Kugele et al. ...................... 285/5 |
| 6,739,629 B2 * | 5/2004 | Riedy et al. .................... 285/321 |
| 6,739,630 B2 | 5/2004 | Riedy |
| 6,921,114 B1 * | 7/2005 | Washburn et al. ............ 285/321 |
| 2003/0025324 A1 | 2/2003 | Guesnon et al. |

* cited by examiner

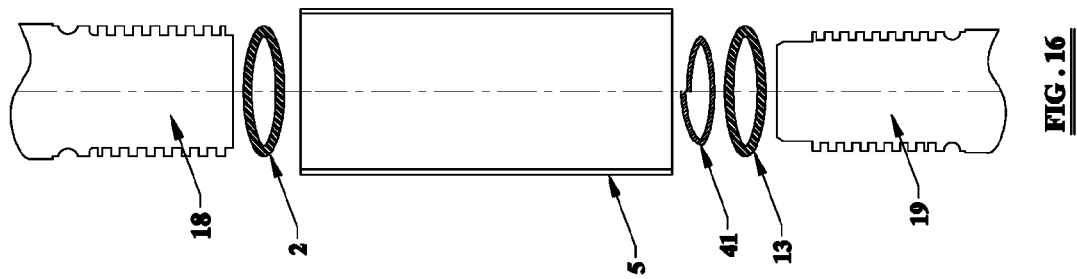

THREADED PIPE JOINT COUPLING WITH WIRE LOCK DEVICE

FIELD OF INVENTION

The invention relates to the development of a threaded Poly Vinyl Chloride (PVC) coupling and pipe joint to join the pipes in water discharge piping system and more particularly to the locking system used in the threaded PVC pipe joint couplings with PVC pipes used for submersible pump applications in bore wells to connect and support the submersible pumps and also to act as delivery pipes to draw water from underground for drinking and irrigation purposes.

BACKGROUND OF THE INVENTION

The application of PVC is widely accepted by the market and day-by-day increasingly new models are emerging for different usages.

Substitute for Irrigation: PVC pipes are first designed to become substitutes in the fields for irrigation purposes to distribute water. These PVC pipes are placed underneath the soil by which they are more advantageous than the metal pipes from rust and damages.

Substitute for drainage & plumbing: PVC pipes are designed to use for supply waste water & potable water to take care of house hold necessities and are used as the plumbing pipes to supply the water from the over head water tanks to the bathrooms and at necessary outlets. Also these are designed as the drainage pipes to carry the drainage from the bathrooms to the common outlets.

Bore wells: Until now for the bore wells it was widely acceptable method of drawing the water from the bore wells through steel galvanized pipes. These steel galvanized pipes are threaded both sides and by using threaded steel galvanized couplings two pipes are joined.

The main disadvantages in these pipes are that they get rusted in the long run and the pipes breaks in the bore well damaging the whole bore & loss of pump.

In addition, these pipes being very heavy requires more staff or special equipments like chain pulley to remove the pipes from bore well when needed for any repairs.

While the galvanized steel pipes are suspended with the load of the pump & filled with water, they corrode & get rusted over a short period of time and the pipe breaks putting the whole equipment at risk of falling inside the bore-well. The threads are prone to corrosion & resistance even more as they are not galvanized.

To overcome this drawback many have tried in developing the alternative light weight, high strength, long life pipes. As the PVC is one alternative to replace the steel galvanized pipes, there have been very few successful inventors to create an alternative for this application.

One such alternative is making the pipes & coupling with PVC material. Pipes are push fitted in a coupling having grooves for rubber rings for providing leak proof fit. The pipes & coupling are fixed together after push fitting with a plugging arrangement. A screw is fitted in order to prevent the rotation of the pipe inside the coupling joint.

Main drawbacks of this type of the models are

1. Load bearing is being done by plugging system, which is insufficient to take the load.

2. Difficult to disassemble as the plugging material gets distorted due to heavy load.

3. Difficult to users to locate and match the plugging point and fix the coupling with pipe.

4. Extra screw is required which could damage pipe & joint on over tightening.

Another alternative developed uses high-density polyethylene HDPE pipes. These pipes are flexible hence are not suitable for column application. These HDPE pipes are soft and since they cannot be threaded, they are lengthy. Over long term usage with heavy pump sets they elongate and lose their shape permanently. Their material becomes hard after some time and cannot be rolled back for removal. Pulling with a tractor disturbs the crop and requires more space. Jointing with fittings with submersible pump & top fitting is very weak as threads are not available.

Since all the alternatives have some type of problem and disadvantages, a better product for use with submersible pumps is most necessary.

The inventor has developed a pipe system which exactly works like a steel galvanized pipes or column pipes made in PVC with added extra features for more reliability, high strength and more advantageous.

OBJECTIVES OF THE INVENTION

1. The objective of the invention is the pipes are made with PVC, very rigid and lightweight & user friendly.

2. Another advantage is the pipe joints are fixed using a threaded coupling joint like in steel galvanized pipes.

3. Another advantage of the invention is the couplings at one end are locked with a wire lock to stop the removal of the coupling totally attaching it to one end of the pipe.

4. Another advantage is the threads are specially designed square threads having very high load holding capacity.

5. Another advantage is that special rubber sealing rings are provided with the thread to ensure 100% leak proof at high pump pressure.

SUMMARY OF THE INVENTION

The pipes of the piping system to draw the water from the bore wells after being constructed with this invention are joined with the couplers before distributing into retail market. Each pipe is sold with one coupler at one end; the coupler is joined to the pipe by threads and sealing system for leak proof. These threads are assembled at the factory. This joint is threaded known as permanent joint. The permanent joint should not be operated in the field by the user during the process of installation/un-installation of the pump system in contrast to the temporary joint on the other side which is operated by the user during installation/un-installation. Even through the bore well depth has increased considerably resulting in very high tensile loads on these threaded joints, the thread joints have adequate capacity to bear these suspended loads and have never failed in the field.

An aluminum wire lock is used in matching grooves partially in pipe and coupler for providing the locking system in the permanent joint. The aluminum metal has been used for higher strength and non-rust & corrosion properties, and is so designed that it may be dismantled for maintenance of the joint. Even with the introduction of this locking system the tensile loads of suspended pump and pipe assembly in the bore well is not shared by the locking system, but is borne by threads only. This unique design of threaded joint in PVC pipe locked by the aluminum metal wire in circular matching grooves is a new and original invention along with the other featured components for permanent solution to the user.

FIG. 16 shows outer alignment of all the components of the assembly of the threaded pipes and coupling system.

DESCRIPTION OF THE PREFERRED EMBODIMENTS

Referral Numerals

Figure 1:
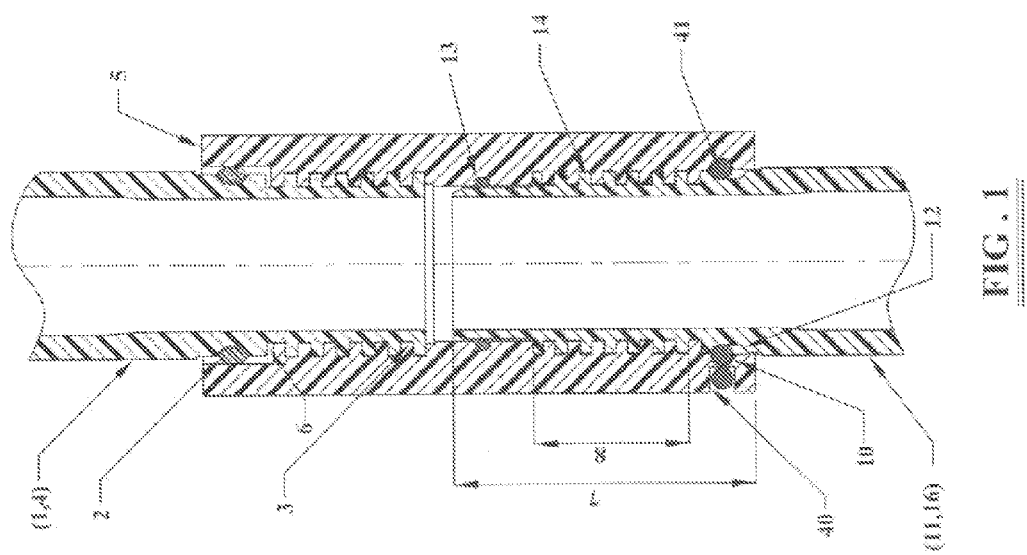
FIG. 1 shows transverse section view of complete assembly of threaded pipes and coupling system.

1, 4: PVC pipe (upper pipe)/pipe at temporary end of the joint.
2: Outer sealing ring
3: Square shaped threads in temporary end
5, 26: Coupler
6: Thread under cut
7: Portion of threaded pipe joint at permanent threaded end
8: Portion of pipe threads engaged to coupler at permanent threaded joint
10: Groove on inside surface of the coupler (5)
11, 16, 29: Lower pipe/pipe at permanent end of the joint.
12: Groove on pipe at permanent end
13: Inner sealing ring
14: Square threads at permanent end
18: Temporary end of the pipe
19: Permanent end of the pipe
21: No fitting allowance available after fitting in coupler
25: Clamps
27: Clamping direction
28: Ground level
30: PVC pipe/coupler joints
31: Water column
32: Casing pipe in the earth
33: Earth
34: Series of PVC column pipes in the bore well
35: Adapter
36: Submersible water pump
37: Sticker
40: Milled groove
41: Wire lock
42: Tangential hole
43: External ribs on the coupler (5)
44: Bent portion of the wire lock (41)
45: End of the wire lock (41)

FIG. 1 illustrates transverse section view of complete assembly of threaded pipes and coupling system. The assembly comprises the PVC pipe (1), sealing ring (2), square thread (3) on temporary joint, upper pipe which is rotated during assembling or dismantling (4), PVC coupler (5), end of threads (6) in the pipe, permanent threaded joint which is factory set and not to be operated by user (7), permanent end threads in engagement (8), groove on the coupler outer surface to fold the wire lock (41), circular wire lock groove (10) which is partially in the coupler (5), lower pipe (11) which is held by clamps during assembling or dismantling of piping, groove (12) on the pipe made longer with respect to the theoretical center line of wire lock (41) for assembling comfort and also to ensure the wire lock (41) does not share the axial load in the usage, inner sealing ring (13), square threads in the permanent joint (14), PVC pipe with permanent end (16). The threads (3, 14) are made with special features having in the shape of squares and are called square shaped threads (3, 14).

Figure 2:
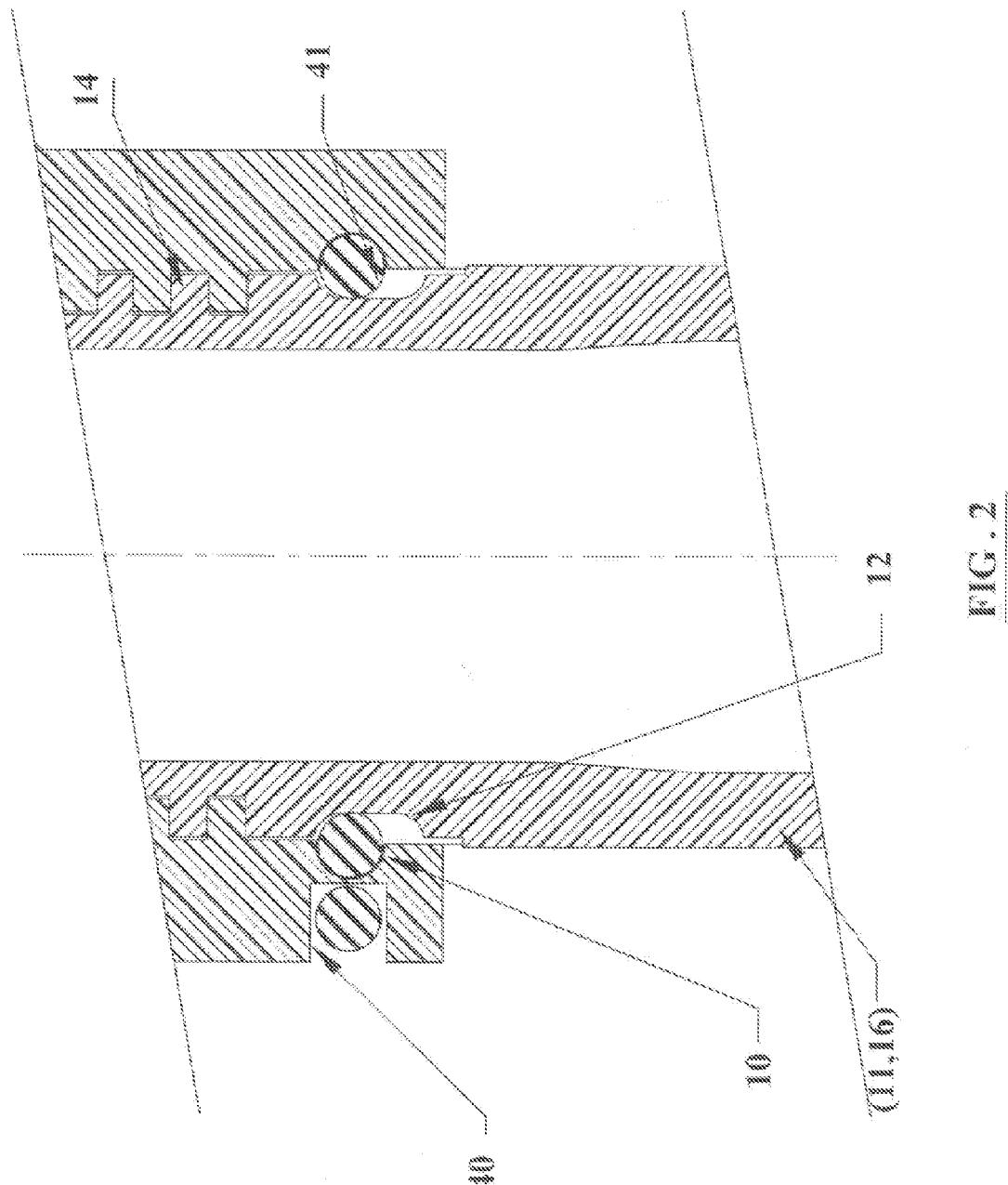
FIG. 2 shows transverse section at permanent coupling end of the showing the threaded pipes and coupling system with wire lock mechanism.

FIG. 2 illustrates transverse section at permanent end of the threaded pipes and coupling system showing the wire lock mechanism.

Figure 3:
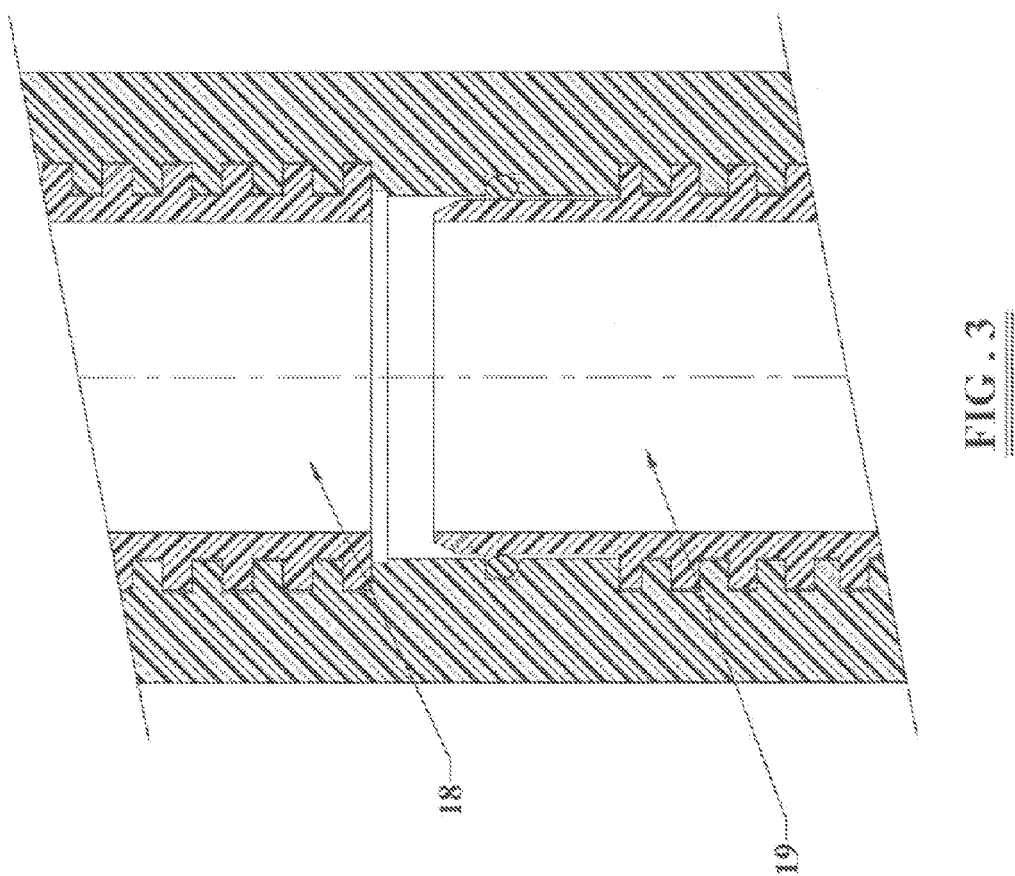
FIG. 3 shows transverse section of the threaded pipes and coupling system showing the permanent coupling end and temporary coupling end partially with two different pipes.

FIG. 3 depicts the temporary end (18) of one pipe, permanent end (19) of the other pipe.

Figure 4:
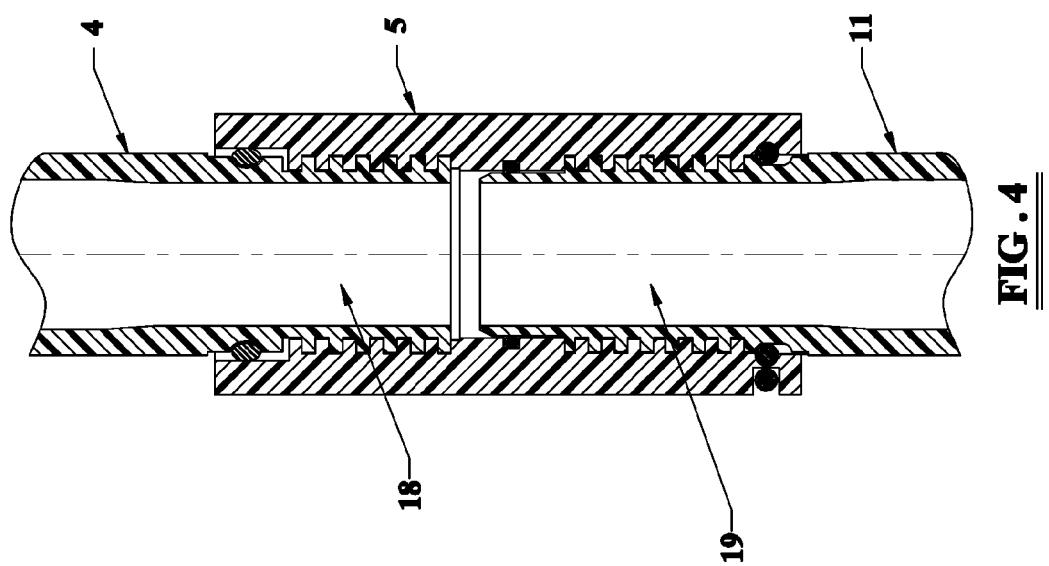
FIG. 4 shows transverse section of complete assembly of threaded pipes and coupling system showing the permanent end and temporary end of the two different pipes joined by a coupler.

FIG. 4 depicts the temporary end (18) of one pipe (4), permanent end (19) of the other pipe (11), a coupler (5) joining both the ends of two pipes (4, 11).

Figure 5:
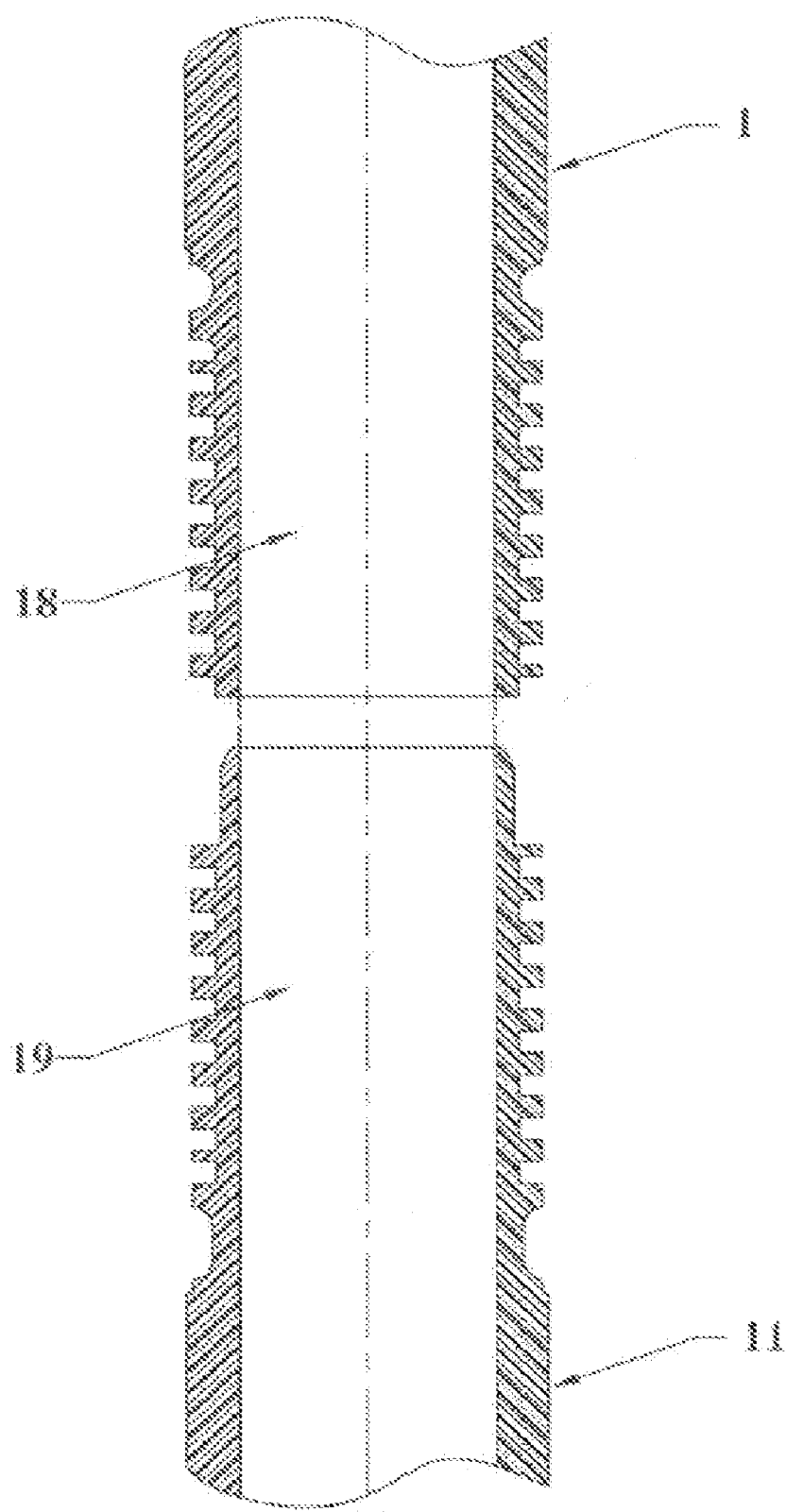
FIG. 5 shows transverse section of two ends of both the pipes in same axis.

FIG. 5 shows transverse section of two ends of both the pipes (1, 11) before joining with a coupler (5). The figure depicts the temporary end (18) of one pipe, permanent end (19) of the other pipe without the coupler (5). One end of the pipe (11) is considered as the permanent end (19) to which a fixed end of the coupler (5) is fitted in the factory. Each permanent end (19) of the pipes (11) is made with the square threads and temporary end (18) of pipe (1) is also made with square threads.

Figure 6:
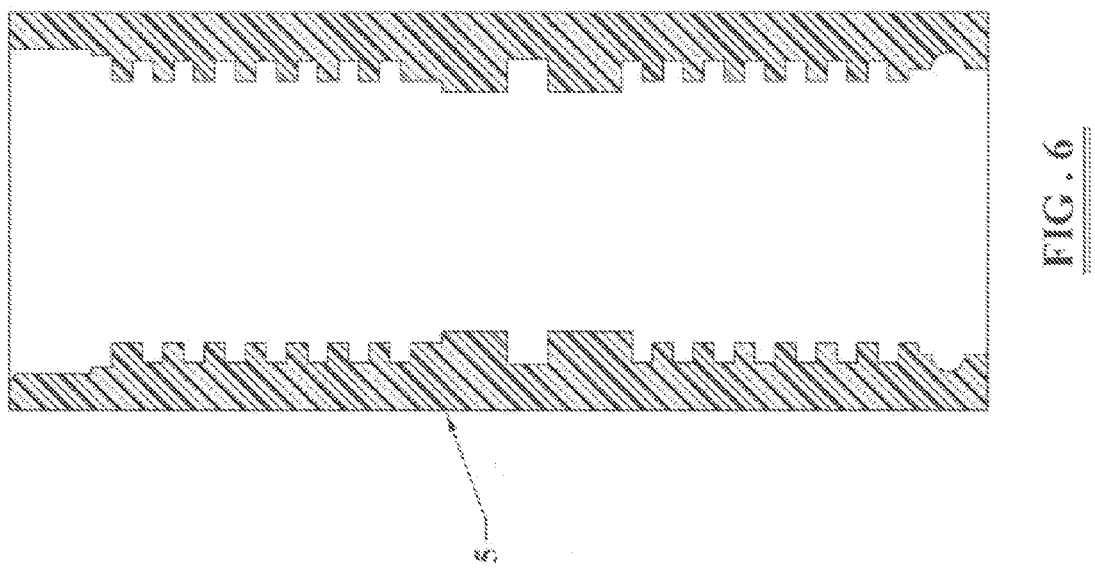
FIG. 6 shows transverse section of coupler before fixing to the permanent end and the temporary end of two different pipes.

FIG. 6 shows transverse section of coupler before fixing to the permanent end and temporary end of two different pipes.

Figure 7:
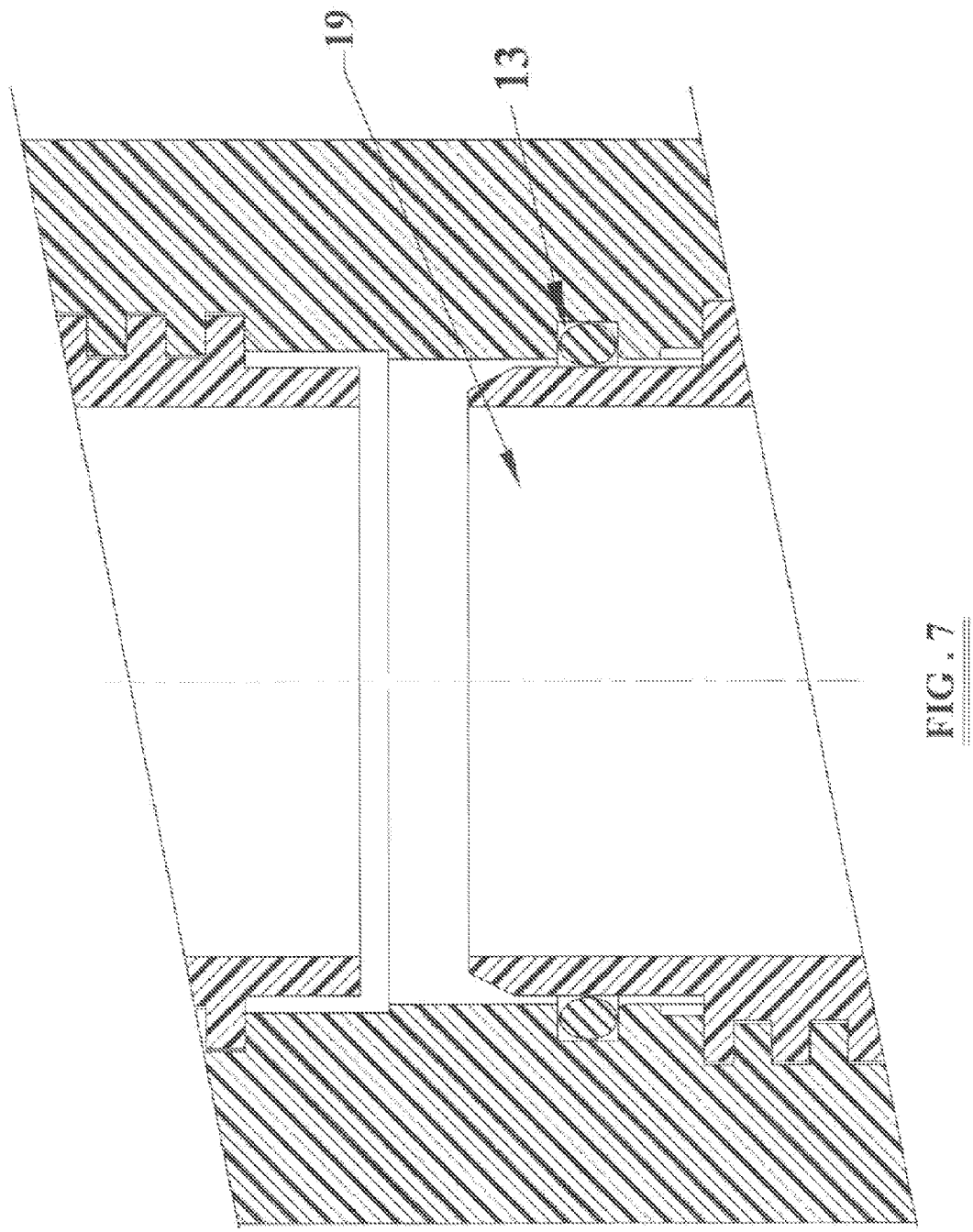
FIG. 7 shows magnified transverse section of the coupler and pipe coupling ends showing permanent joint comprising inner sealing ring fixed at the permanent joint.

FIG. 7 depicts the inner sealing ring (13) which is fixed to the permanent ends (19) of the pipe (11) and the coupler (5).

Figure 8:
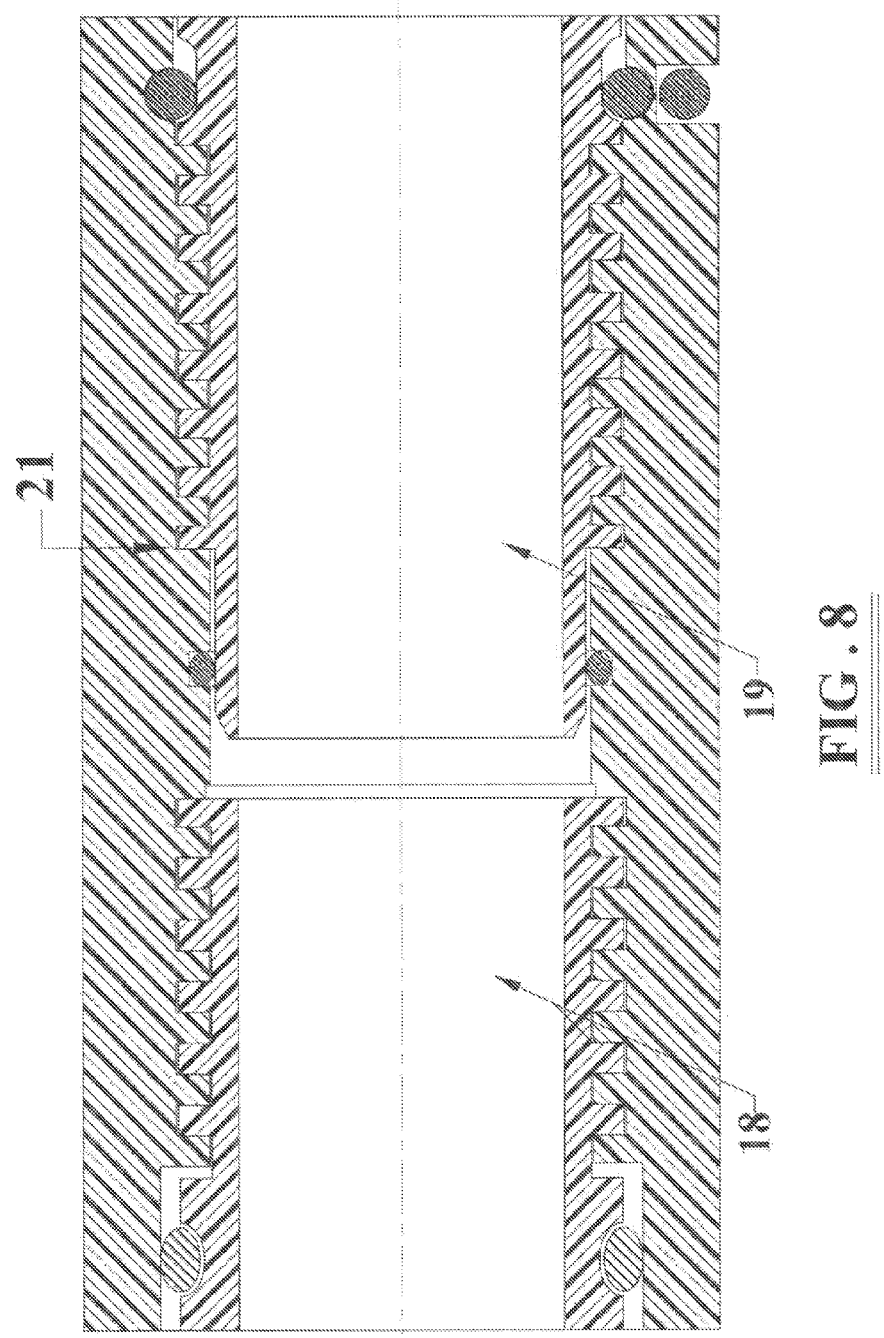
FIG. 8 shows transverse section of the threaded pipes and coupling system and pipe ends showing threads at the permanent coupling end wherein there is no extra travel space at thread after complete fitting or assembling.

FIG. 8 depicts the coupler (5) fixed with both the temporary end (18), and permanent end (19) to which the threading has no extra travel for further fitting (21).

Figure 9:
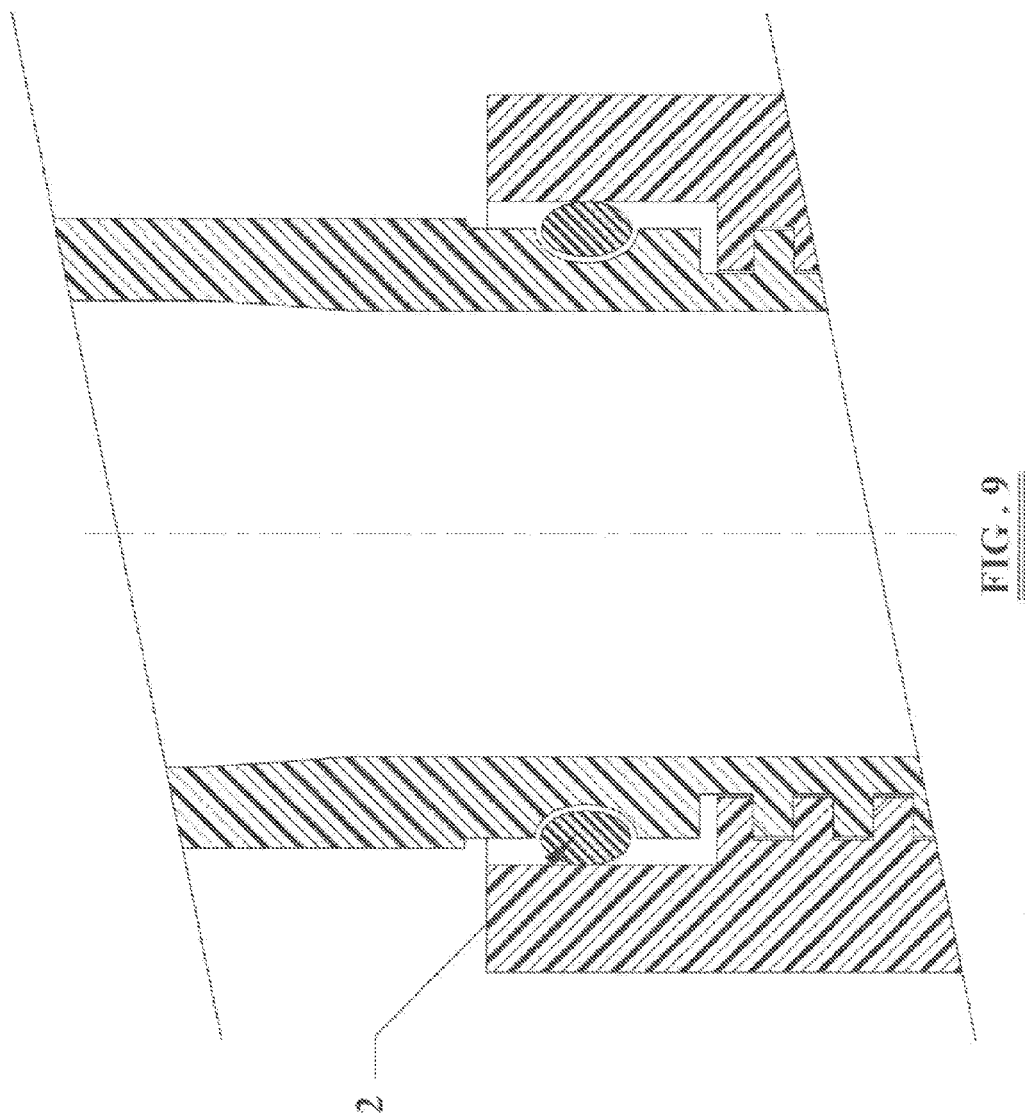
FIG. 9 shows transverse section of the threaded pipes and coupling system at the temporary coupling end showing an outer sealing ring is fixed between the coupler and the pipe.

FIG. 9 depicts the outer sealing ring (2) fixed at the temporary end (18) of the pipe (4) and the coupler (5).

Figure 10:
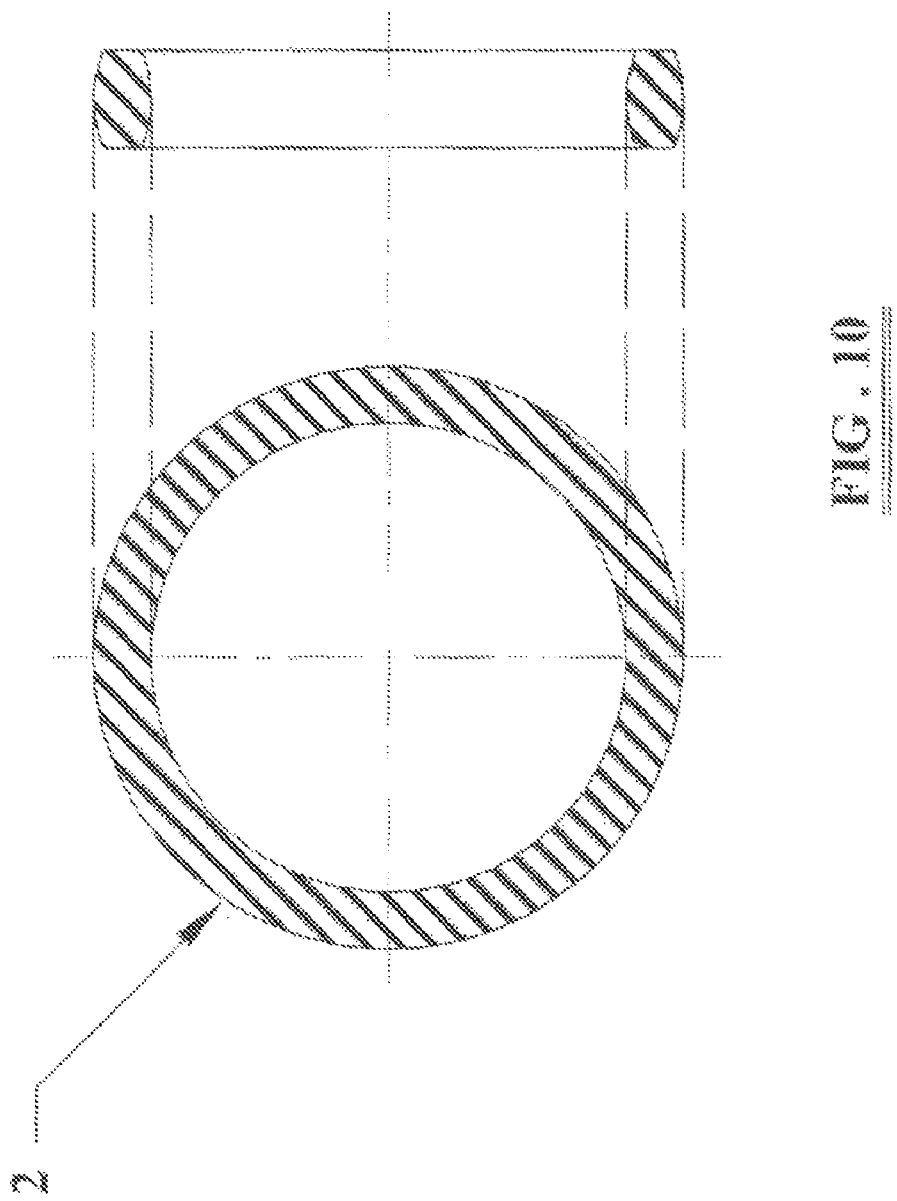
FIG. 10 shows top view and cross sectional view of the outer sealing ring before fitting or assembling.

FIG. 10 depicts the cross sectional view of the outer sealing ring (2) which is fixed in the groove provided in the temporary end (18) of the pipe (4) and seated in the coupler (5). This outer sealing ring (2) is made in a specific shape as the contact surfaces are round and the two sides are flattened to fix exactly into the groove and there is no leakage of any water from the threading after the temporary end (18) is fixed.

Figure 11:
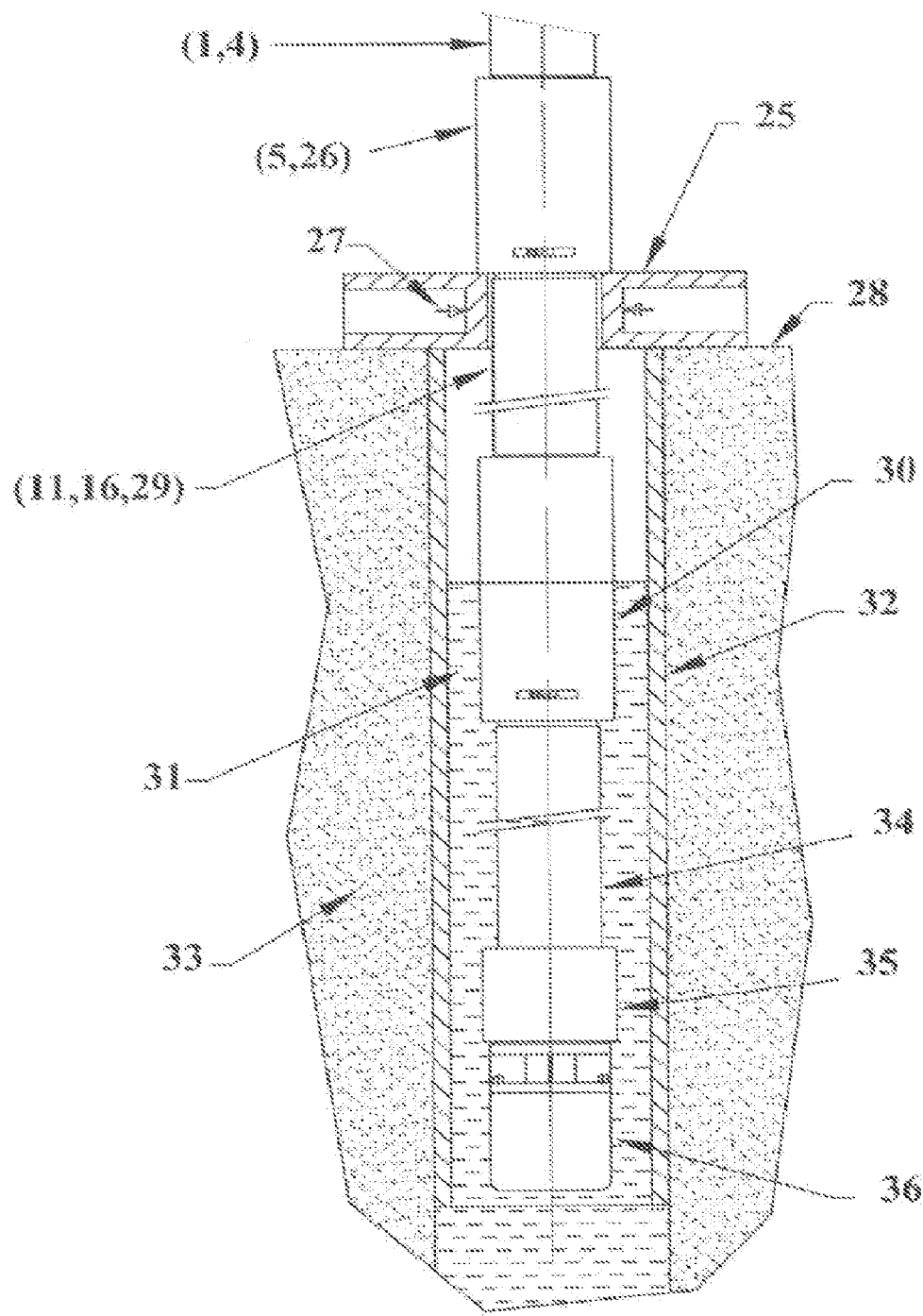
FIG. 11 shows vertical sectional view of series of the threaded pipes and coupling systems fixed to a submersible pump inside bore well clamped at top.

FIG. 11 depicts the upper pipe (4) with temporary end (18) which is rotated during assembling/dismantling at the assembling sight near bore-well and when the upper pipe (4) is rotated only the temporary end (18) is loosened and the permanent end below remains undisturbed, clamps (25) to hold the suspended column pipes system giving support to the coupler (5) and also during assembling/dismantling of piping system, PVC coupler (26), direction of clamping (27), ground level (28), lower pipe (29) which is held by clamps during assembling/dismantling of piping system, series of PVC pipe/coupler joints (30) in the bore well, water column (31), casing pipe in the earth (32), earth (33), series of PVC column pipes in the bore well (34), adapter (35) for connecting the pump to the PVC column pipe, submersible water pump (36).

Figure 12:
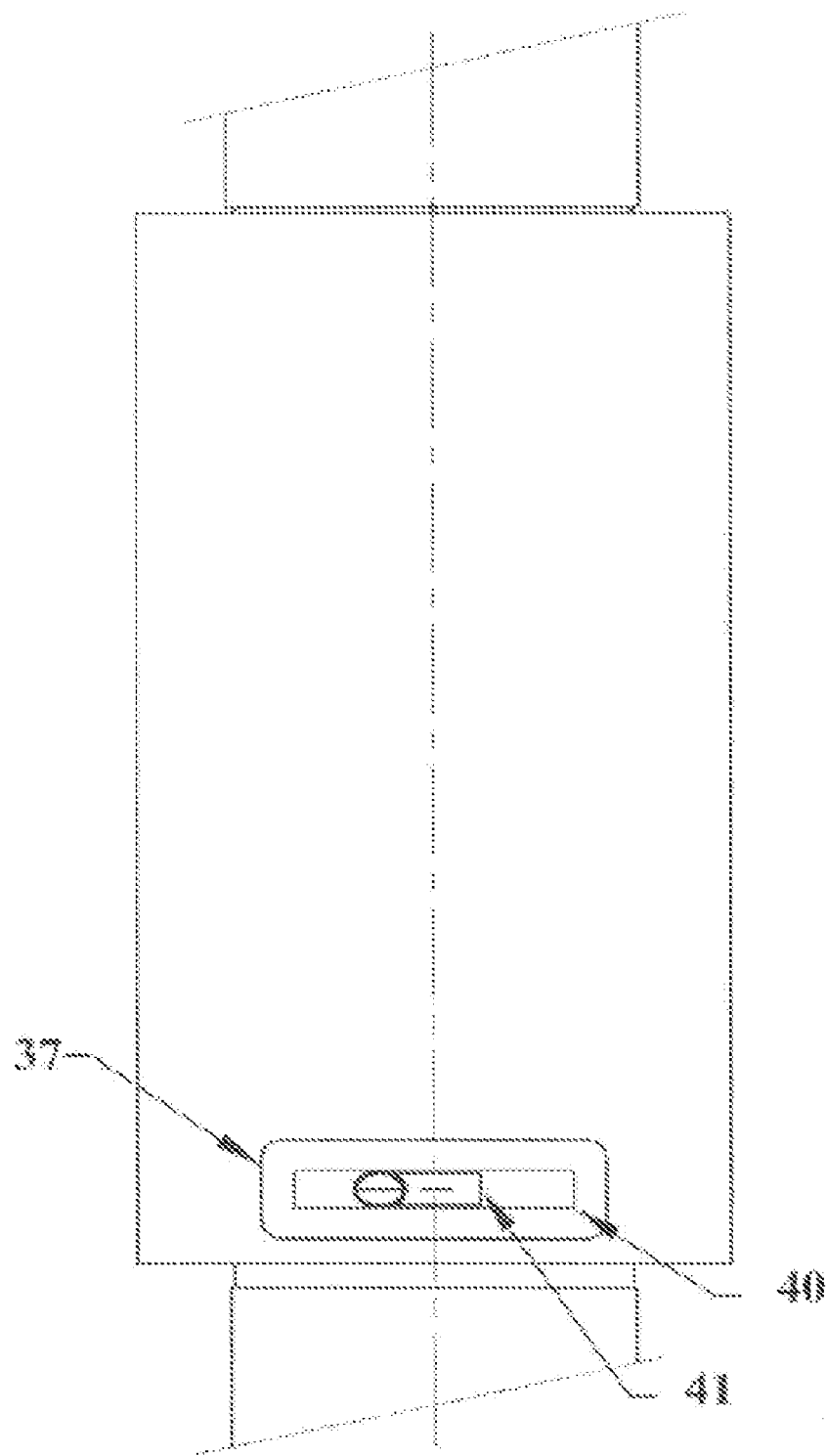
FIG. 12 shows front view of the threaded pipes and coupling system showing folded wire lock after complete assembly of the pipes with the coupler.

FIG. 12 depicts the sticker (37) around wire lock groove, milled groove (40), wire lock (41).

Figure 13:
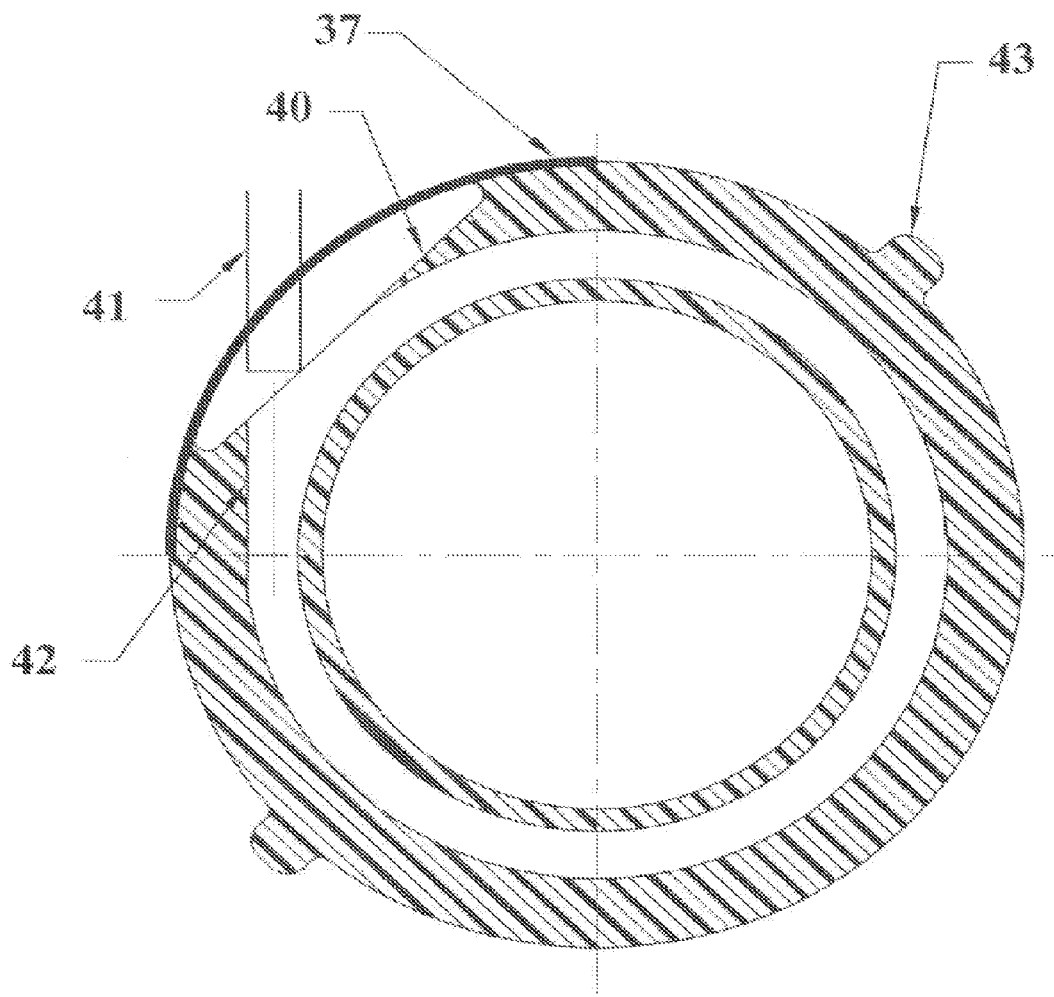
FIG. 13 shows cross sectional view of the threaded pipes and coupling system taken through circumferential passage to show a process of wire lock insertion into the circumferential passage through a tangential hole made on the coupler.

FIG. 13 depicts the groove (40) in the coupler (5) for folding the wire lock, aluminum wire lock (41) at the start of insertion, tangential hole (42) in the coupler for inserting the wire lock, ribs (43) in two numbers diametrically opposite provided on the outer surface of coupler for holding the coupler for fixing the joint.

Figure 14:
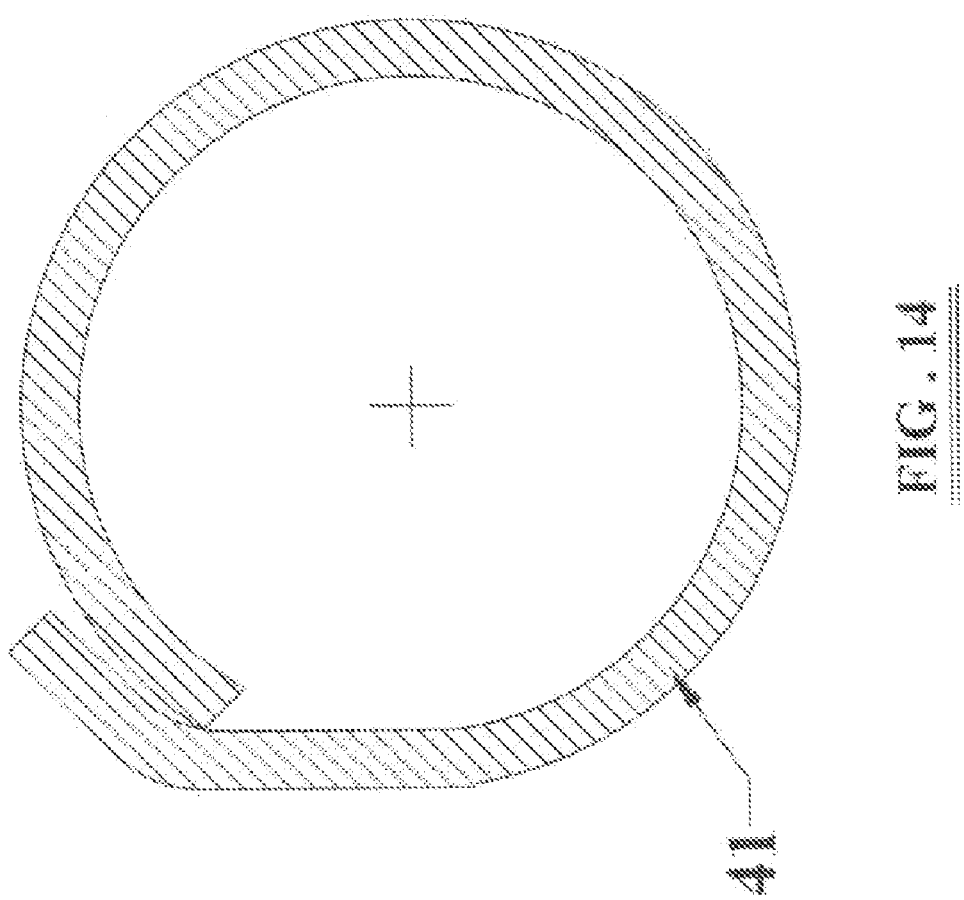
FIG. 14 shows top view of the wire lock as it resides in the circumferential passage formed with matching grooves of the coupler and pipe at the permanent coupling end.
Figure 14J:
FIG. 14j shows cross sectional view of the wire lock made of metal and is in sides flattened shape.
Figure 14K:
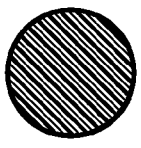
FIG. 14k shows cross sectional view of the wire lock made of plastic and is in sides flattened shape.
Figure 14L:
FIG. 14l shows cross sectional view of the wire lock made of rubber and is in sides flattened shape.

FIG. 14 depicts the aluminum wire lock (41) in resting position or inserted position.

Figure 14O:
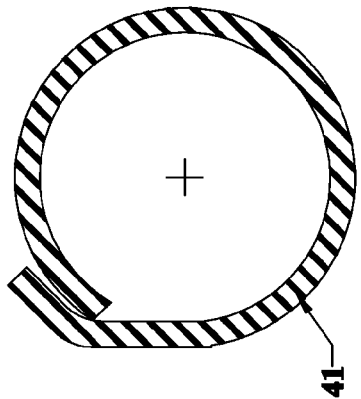
FIG. 14o shows top view of the wire lock made of rubber as it resides in circumferential passage formed with matching grooves of the coupler and pipe at the permanent coupling end.
Figure 14G:
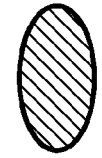
FIG. 14g shows cross sectional view of the wire lock made of metal and is in square shape.
Figure 14H:
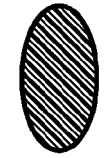
FIG. 14h shows cross sectional view of the wire lock made of plastic and is in square shape.
Figure 14I:
FIG. 14i shows cross sectional view of the wire lock made of rubber and is in square shape.
Figure 14N:
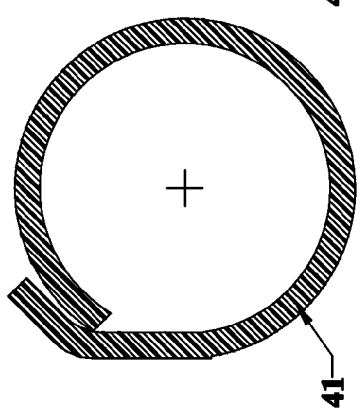
FIG. 14n shows top view of the wire lock made of plastic as it resides in circumferential passage formed with matching grooves of the coupler and pipe at the permanent coupling end.
Figure 14D:
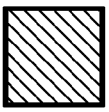
FIG. 14d shows cross sectional view of the wire lock made of metal and is in oval shape.
Figure 14E:
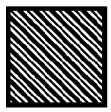
FIG. 14e shows cross sectional view of the wire lock made of plastic and is in oval shape.
Figure 14F:
FIG. 14f shows cross sectional view of the wire lock made of rubber and is in oval shape.
Figure 14A:
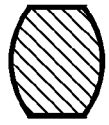
FIG. 14a shows cross sectional view of the wire lock made of metal and is in circular shape.
Figure 14B:
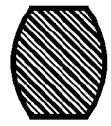
FIG. 14b shows cross sectional view of the wire lock made of plastic and is in circular shape.
Figure 14C:
FIG. 14c shows cross sectional view of the wire lock made of rubber and is in circular shape.
Figure 14M:
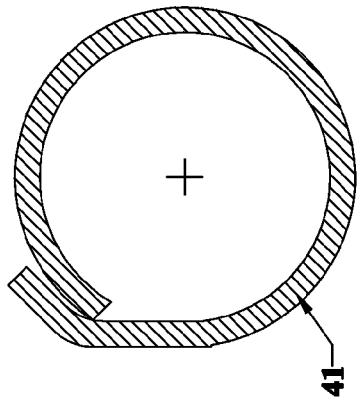
FIG. 14m shows top view of the wire lock made of metal as it resides in circumferential passage formed with matching grooves of the coupler and pipe at the permanent coupling end.

FIGS. 14a-14o depict the various shapes and materials used for wire lock. The shape can be of round, oval, square or sides flattened. The material is of any metal, rubber or plastic.

Figure 15:
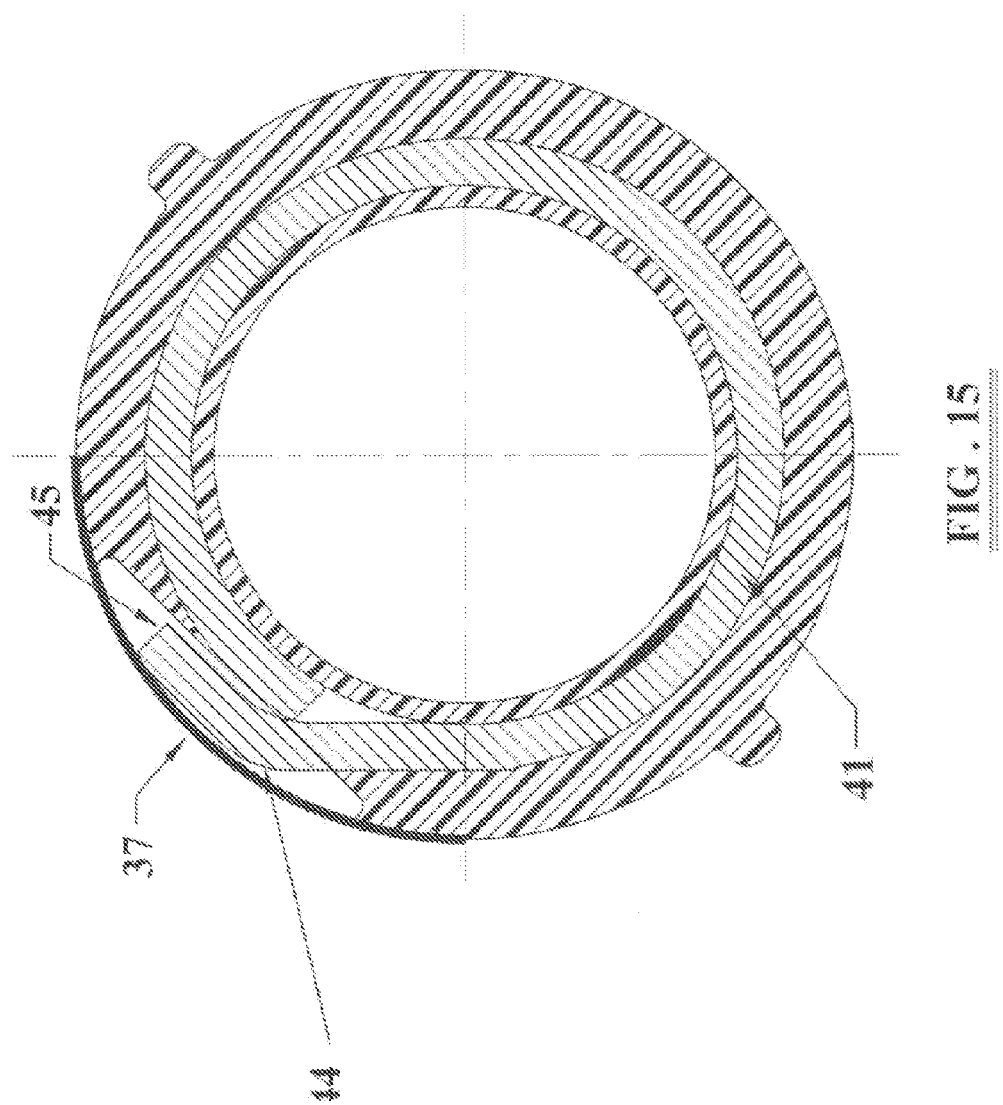
FIG. 15 shows cross sectional view of the threaded pipes and coupling system taken through circumferential passage to show a process of wire lock insertion into the circumferential passage through a tangential hole made on the coupler.

FIG. 15 depicts the sticker (37) around the groove, aluminum wire lock (41) in resting or inserted position, bent portion (44) of wire lock (41) which may be straightened for pulling the wire lock out for dismantling the threaded joint for replacement of sealing ring (13) at the permanent end (19) of pipe (11) & other joint maintenance, end of the wire lock (45) folded within the enveloping circle of outer diameter of coupler (5).

FIG. 16 depict the exploded view of the items in the joint assembly. (18) is the temporary end of pipe, (2) is the outer sealing ring, (5) is coupler, (41) wire lock, (13) inner sealing ring, (19) is the permanent end of the pipe.

The invention addresses problems faced at users end. As these are two threaded coupling ends in each coupler and during the process of un-installation, for every pipe the user is supposed to unthread only the temporary joint which is possible only by holding the coupler with the pipe wrench and unscrew the top mating pipe. During this condition a clamp is used just below the coupler to give support and grip the pipe and pump assembly. This process is repeated during disassembly of every pipe joint. To hold the coupler positively with pipe wrench, the provision has been given in the form of two external ribs on the outer surface of the coupler. In spite of all the provisions, the user in many cases does not hold the coupler, but starts unthreading the mating upper pipe during un-installation in the temporary joints. Since the threads are tightened against run out only and there is no positive locking system to retain the permanency of the permanent joint, which results in rotation of the coupler and also the permanent joint end. The coupler comes out leaving the bottom pipe which is holding the assembly. As the clamping force is not sufficient to grip the smooth surface of the pipe this results the entire pump and pipe assembly falling into the bore well causing much difficulty for retrieval. Also during the factory setting of the permanent joint, considerable amount of stress gets induced in pipe and coupler because of full tightening done against run out. Therefore, it is necessary that the permanent joint has to be given a fool-proof locking system to over-come the above problem.

The construction of the whole invention can be explained in two phases. The first phase is fixing the coupler with the permanent end of the pipe in the factory and the second phase is fixing of temporary end of another similar pipe so as to join both the pipes using a coupler.

One end of the pipe is considered as the permanent end to which a fixed end of the coupler is fitted in the factory. Each permanent end (19) of the pipe is made with the threads as shown in FIG. 5.

The groove (12) is made after the threads (3) on the pipe (11). The groove (12) is longer than the diameter of wire lock (41) to be fixed in it because during factory fitting of the permanent joint, as they were over tightened against thread run out, considerable amount of stress were induced on the pipe (11) and coupler (5) which has been totally avoided with this invention. Now there is no requirement for extra tightening as shown in FIG. 1. The groove (12) when matched with the groove (10) of the coupler (5) joins with the tangential hole (42) formed from the groove (40) of the coupler (5) for inserting the wire lock (41) as shown in FIG. 13.

The threading in the pipe is made such that it exactly matches the threading of the coupler with fitting allowances so there is no extra travel (21) available for further fitting as shown in FIG. 8. The front of the permanent end is turned to form a seat for fitting with the rubber sealing ring in the coupler.

The other end of the pipe is considered as the temporary end, which is screwed into the temporary end of the fixed coupler to the other pipe. The groove is made at the bottom of the threading to fix the sealing ring (2) as shown in the FIG. 9. The outer sealing ring (2) is in the shape which contact surfaces are made round and the sides are made flattened as to act as effective sealing ring as shown in the FIG. 10.

The coupler (5) is a common joining media to which one end is fixed to a permanent end of one pipe and the other end is fixed to the temporary end of the other pipe. The coupler (5) is made of polyvinyl chloride material by which it gives the advantage of lighter weight and non-corrosive properties. The coupler (5) both ends are threaded with square threads to suit the both ends of the pipes (1, 11).

At the inner threading of the permanent end of the coupler, at the end provision is made for the sealing ring (13) to be fixed which acts as the sealing ring for the permanent end of pipe as shown in FIG. 1. In the square groove of the coupler, a sealing ring (13) is provided or fixed as shown in FIG. 7. At the mouth of the permanent end of the threading in the coupler (5), a groove (10) is made to fix the wire lock (41) as shown in FIGS. 1 and 2. And as shown in the FIG. 12 a milled groove (40) is made for insertion of the wire lock (41) and thereafter folding of the wire lock (41).

Ribs (43) are provided on outer surface of the coupler (5) as shown in FIG. 13. The ribs (43) act as holding supporters for wrench during tightening or loosening operations.

To the permanent end (19) of the pipe, the coupler (5) is screwed over it so that the coupler (5) is tightened properly. The coupler (5) is tightened to the last stage of the thread (8) so that there is no extra travel space (21) in the threading as shown in FIGS. 1 and 8. As the inner sealing ring (13) is pre-fixed inside the coupler (5), it will act as the sealing ring to the permanent end (19) of the pipe. The aluminum wire lock (41) is taken and inserted through the tangential hole (42) into the coupler groove (10) and the pipe groove (12) as shown in FIGS. 13, 14 and 15. The left out wire is cut exactly to meet the size of the groove and bent (44) inside the milled groove (40) as shown in the FIG. 15. To this stage the coupler (5) is fixed to the permanent end (19) in the factory and is locked with the wire lock (41) so as to make sure that there will not be any disturbance of removing this end while assembling/dismantling the complete piping system.

An aluminum wire lock (41) is used in matching grooves partially in pipe and coupler for providing the locking system. Aluminum metal has been used for higher strength with respect to PVC polymer and water compatibility of the metal. The locking system is so designed that it may be dismantled for maintenance of the sealing rings. By this method of wire locking system, even after the introduction of this locking system the tensile loads of suspended pump and pipe assembly in the bore well is not shared by the locking system but is borne by square threads only. This unique design of threaded joint in PVC pipes locked by the aluminum metal lock wire in the circular groove is the crux of the invention with all other specific components to support this invention.

This locking system after fixing at the factory is subjected to testing by taking following considerations into account:

a. The temporary joint of coupler and pipe needs a maximum of 10 kgm torque to open.

b. An average human being can apply up to 20 kgm torque with a ½ meter long pipe wrench normally used in the field.

To the temporary end of the other pipe, an outer sealing ring (2) is fixed which will act as the sealing ring to the temporary end. The temporary end is screwed into the coupler, which is already fixed to the permanent end. The temporary end is screwed to such an extent that threading is fixed properly and tightly holding the coupler by a proper joint. This stage starts at the sight of the bore well where assembling/dismantling of the whole piping system takes place.

Thus the whole piping system is joined using this system for drawing the water from the bore wells.

The main advantage of having this system is that by the wire lock system there may not be any danger of removal of the permanent end of the coupler which is fixed and locked in the factory and thereby slipping of the column pipe & pump is totally avoided.

By joining both the pipes with a coupler having threads will have higher weight holding capacity. The threading here is square shaped so that the threads do not slip or damage after several operations.

A clamp can be used to assemble/dismantle the whole piping system. There is no danger of the slipping of the clamp in this case as it properly holds the coupler at the permanent end. And while dismantling there is no chance of layman opening the permanent end as it is permanently locked using a wire lock.

This invention is not limited to the wire lock having been made with the aluminum metal but any other metal can be used and even a PVC wire lock can be used which is fixed inside the coupler. Any rubber made wire locks may also be used depending on the strength of the pipes and the load bearing capacity.

I claim:

1. A threaded pipes and coupler system, said system comprising:
    a coupler made of polyvinyl chloride comprising:
    a permanent coupling end and a temporary coupling end, wherein the permanent coupling end and the temporary coupling end are configured with square-shaped threads on inner surfaces thereof;
    a groove for accommodating a wire lock, wherein the groove is provided on the inner surface of the coupler at the permanent coupling end;
    a tangential hole drilled at the permanent coupling end from an outer surface of the coupler to the inner surface of the coupler to meet the groove provided on the coupler for accommodating the wire lock;
    an inner sealing ring groove provided proximate to a middle portion of the coupler towards the permanent coupling end; and
    a milled groove provided on the outer surface of the coupler and located at the permanent coupling end of the coupler, wherein the milled groove and the groove for accommodating the wire lock are located adjacent to each other at the permanent coupling end of the coupler;
    a first pipe and a second pipe, each made of polyvinyl chloride and comprising square-shaped threads on an outer surface and a groove located at an end of the square-shaped threads and on the outer surface of each of the pipes, wherein the first pipe is connected to the permanent coupling end of the coupler and the second pipe is connected to the temporary coupling end of the coupler;
    an inner sealing ring provided at the inner sealing ring groove of the coupler; and
    a wire lock, wherein the wire lock is inserted into the tangential hole and passed through a circumferential passage formed by matching the groove made on the coupler with the groove made on the outer surface of the first pipe after complete threading of the first pipe with the coupler for accommodating the wire lock to lock the coupler and the first pipe to form a permanent joint.

2. The threaded pipes and coupler system of claim 1, wherein a cross section of the wire lock is of a shape selected from a group comprising round, oval, square and sides flattened.

3. The threaded pipes and coupler system of claim 2, wherein the wire lock comprises at least one of metal, rubber and plastic.

4. The threaded pipes and coupler system of claim 2, wherein the groove on the outer surface of the first pipe is longer than the groove on the inner surface of the coupler.

5. The threaded pipes and coupler system of claim 2, wherein a sealing ring is provided in the groove of the second pipe.

6. The threaded pipes and coupler system of claim 2, wherein the first pipe further comprises a non-threaded portion thereof which is machined to form a seat for the coupler inner sealing ring.

7. The threaded pipes and coupler system of claim 1, wherein the wire lock comprises at least one of metal, rubber and plastic.

8. The threaded pipes and coupler system of claim 7, wherein the groove on the outer surface of the first pipe is longer than the groove on the inner surface of the coupler.

9. The threaded pipes and coupler system of claim 7, wherein a sealing ring is provided in the groove of the second pipe.

10. The threaded pipes and coupler system of claim 7, wherein the first pipe further comprises a non-threaded portion thereof which is machined to form a seat for the coupler inner sealing ring.

11. The threaded pipes and coupler system of claim 1, wherein the groove on the outer surface of the first pipe is longer than the groove on the inner surface of the coupler.

12. The threaded pipes and coupler system of claim 11, wherein a sealing ring is provided in the groove of the second pipe.

13. The threaded pipes and coupler system of claim 11, wherein the first pipe further comprises a non-threaded portion thereof which is machined to form a seat for the coupler inner sealing ring.

14. The threaded pipes and coupler system of claim 1, wherein a sealing ring is provided in the groove of the second pipe.

15. The threaded pipes and coupler system of claim 14, wherein the first pipe further comprises a non-threaded portion thereof which is machined to form a seat for the coupler inner sealing ring.

16. The threaded pipes and coupler system of claim 1, wherein the first pipe further comprises a non-threaded portion thereof which is machined to form a seat for the coupler inner sealing ring.

* * * * *

UNITED STATES PATENT AND TRADEMARK OFFICE
CERTIFICATE OF CORRECTION

| | |
|---|---|
| PATENT NO. | : 8,246,084 B2 |
| APPLICATION NO. | : 11/569591 |
| DATED | : August 21, 2012 |
| INVENTOR(S) | : Deepak Poddar |

It is certified that error appears in the above-identified patent and that said Letters Patent is hereby corrected as shown below:

Figure 2, the leftmost reference numeral, is partially cut off, and should read,
40

Column 2, line 52 should read,
though the bore well depth has increased considerably Column 3, above line 1 should contain the heading,
DESCRIPTION OF THE DRAWINGS Column 5, line 58 should read,
FIG. 12 depicts sticker (37) around wire lock groove, Signed and Sealed this
Twenty-seventh Day of November, 2012

David J. Kappos
*Director of the United States Patent and Trademark Office*